(12) United States Patent
Sato et al.

(10) Patent No.: US 7,632,915 B2
(45) Date of Patent: Dec. 15, 2009

(54) PRODUCTION PROCESS AND WASHING METHOD OF POLY(ARYLENE SULFIDE), AND PURIFICATION PROCESS OF ORGANIC SOLVENT USED IN WASHING

(75) Inventors: Hiroyuki Sato, Fukushima (JP); Tatsuya Kawasaki, Tokyo (JP); Yasushi Nakazawa, Fukushima (JP)

(73) Assignee: Kureha Corporation, Tokyo (JP)

( * ) Notice: Subject to any disclaimer, the term of this patent is extended or adjusted under 35 U.S.C. 154(b) by 701 days.

(21) Appl. No.: 10/540,834

(22) PCT Filed: Dec. 19, 2003

(86) PCT No.: PCT/JP03/16333

§ 371 (c)(1),
(2), (4) Date: Jun. 23, 2005

(87) PCT Pub. No.: WO2004/060973

PCT Pub. Date: Jul. 22, 2004

(65) Prior Publication Data

US 2006/0086374 A1   Apr. 27, 2006

(30) Foreign Application Priority Data

Dec. 27, 2002   (JP) ............................. 2002-382176

(51) Int. Cl.
*C08G 63/90* (2006.01)

(52) U.S. Cl. ...................... 528/490; 528/480; 528/495; 528/502 R; 528/373

(58) Field of Classification Search ................. 524/520, 524/609; 528/387, 374, 481, 499, 480, 373, 528/490, 495, 502 R
See application file for complete search history.

(56) References Cited

U.S. PATENT DOCUMENTS 3,707,528 A   12/1972  Miles 4,769,442 A   9/1988   Iwasaki et al.
4,845,190 A   7/1989   Inoue et al.
5,840,830 A   11/1998  Miyahara et al.
2005/0087215 A1 *  4/2005  Miyahara et al. .............. 134/32

FOREIGN PATENT DOCUMENTS

| JP | 61007332 | 1/1986 |
| JP | 61255933 | 11/1986 |
| JP | 63159435 | 7/1988 |
| JP | 02160833 | 6/1990 |
| JP | 02160834 | 6/1990 |
| JP | 05032782 | 2/1993 |
| JP | 07330903 | 12/1995 |
| JP | 09286861 | 11/1997 |
| JP | 11349566 | 12/1999 |
| JP | 2000191785 | 7/2000 |
| JP | 2001354769 | 12/2001 |
| WO | WO/03/048231 | * 6/2003 |

OTHER PUBLICATIONS

Lehr, Jay; Keeley, Jack; Lehr, Janet Water Encyclopedia, vols. 1-5. (pp. 350-352). John Wiley & Sons. Online version available at: http://knovel.com/web/portal/browse/display?_EXT_KNOVEL_DISPLAY_bookid=1449&VerticalID=0.*

Lehr, Jay; Keeley, Jack; Lehr, Janet Water Encyclopedia, 2005, vols. 1-5. (pp. 350-352). John Wiley & Sons. Online version available at: http://knovel.com/web/portal/browse/display?_EXT_KNOVEL_DISPLAY_bookid=1449&VerticalID=0.*

* cited by examiner

*Primary Examiner*—Ling-Siu Choi
*Assistant Examiner*—Frances Tischler
(74) *Attorney, Agent, or Firm*—Porter, Wright, Morris & Arthur LLP

(57) ABSTRACT

A process for producing a poly(arylene sulfide), comprising the respective steps of a washing step of washing a polymer separated from a reaction mixture containing the polymer formed with an organic solvent, which is arranged after a polymerization step, a purification step of purifying the organic solvent recovered after the washing step to lower the content of an alkaline compound mixed therein, and a step of recycling the purified organic solvent through the washing step of the poly(arylene sulfide).

12 Claims, No Drawings

PRODUCTION PROCESS AND WASHING METHOD OF POLY(ARYLENE SULFIDE), AND PURIFICATION PROCESS OF ORGANIC SOLVENT USED IN WASHING

RELATED APPLICATION

The present application is a 371 of PCT/JP2003/016333 file Dec. 19, 2003.

TECHNICAL FIELD

The present invention relates to a production process of a poly(arylene sulfide), and particularly to a production process of a poly(arylene sulfide), comprising the steps of washing a poly(arylene sulfide) obtained by a polymerization step in an organic amide solvent with an organic solvent, recovering the organic solvent and then reducing the content of alkaline compounds such as methylamine contained in the organic solvent recovered to recycle the purified organic solvent through the washing step.

The present invention also relates to a washing method of a poly(arylene sulfide) obtained in a polymerization step. The present invention further relates to a purification process of an organic solvent used in washing of the poly(arylene sulfide).

BACKGROUND ART

Poly(arylene sulfides) (hereinafter abbreviated as "PASs") represented by poly(phenylene sulfide) (hereinafter abbreviated as "PPS") are engineering plastics excellent in heat resistance, chemical resistance, flame retardancy, mechanical properties, electrical properties, dimensional stability and the like. The PASs are commonly used in a wide variety of fields such as electrical and electronic equipments and automotive equipments because they can be formed or molded into various kinds of molded or formed products, films, sheets, fibers, etc. by general melt processing techniques such as extrusion, injection molding and compression molding.

As a typical production process of a PAS, is known a process, in which an alkali metal sulfide that is a sulfur source is reacted with a dihalo-aromatic compound in an organic amide solvent such as N-methyl-2-pyrrolidone. As the sulfur source, a combination of an alkali metal hydrosulfide and an alkali metal hydroxide is also used.

Secondarily produced salts such as NaCl, oligomers, polymerization aids, decomposition products and/or the like are contained together with a PAS formed in the reaction mixture by the polymerization reaction of the sulfur source with the dihalo-aromatic compound in the organic amide solvent. It is difficult to sufficiently remove these impurities even when the granular polymer formed is separated from the reaction mixture by sieving and washed with water. In many cases, a step of washing the PAS formed with the same organic amide solvent as the polymerization solvent, or an organic solvent such as a ketone (for example, acetone) or an alcohol (for example, methanol) is thus arranged as a post treatment step. Among these organic solvents (hereinafter also referred to as "washing solvents") for washing, acetone and methanol are commonly used because they are easily recovered by distillation owing to their low boiling points, and are excellent in detergency.

These washing solvents are repeatedly used in the washing step of the production of PASs. When a washing solvent is repeatedly used, a liquid component such as a filtrate containing many impurities, an organic amide solvent, etc. in addition to the washing solvent is distilled after the washing step to recover the washing solvent.

However, the present inventors have found that when a washing solvent such as acetone is repeatedly used (i.e., "recycled through") in the washing step, the mere purification of the washing solvent by distillation does not permit sufficiently removing a minute amount of impurities that adversely affect the quality of a PAS formed, and the physical properties of the PAS after washing are adversely affected.

More specifically, it has been proven that when the washing solvent is repeatedly recovered to reuse it in the washing step, the PAS after the washing is colored, or the melt viscosity of the PAS is lowered in an extreme case. As a result, the washing solvent cannot be used further repeatedly.

Further, although a PAS formed is treated with an aqueous solution or organic solvent solution of an acid or a salt (for example, ammonium chloride) of a weak alkali and a strong acid in a post treatment step in order to raise the crystallization temperature (Tmc: also referred to as "melt crystallization temperature") of the PAS, the effect by the acid or salt is reduced when the washing solvent is repeatedly recovered by distillation to recycle it through the washing step, so that the crystallization temperature is hard to be raised. When the crystallization temperature of the PAS is lowered, the efficiency of a molding operation is reduced because, for example, the cycle of injection molding is elongated.

However, recognition as to purification of the washing solvent used in the washing step of the PAS has heretofore been too low to propose effective means for solving such problems as described above. On the other hand, some methods have been proposed as to purification of the organic amide solvent used in the polymerization step.

As a process for recovering N-methyl-2-pyrrolidone from a slurry of a PAS obtained by reacting an alkali metal sulfide with a dihalo-aromatic compound in N-methyl-2-pyrrolidone to purify it, there has heretofore been proposed a process comprising adding a small amount of an alkali metal hydroxide and/or an alkali metal carboxylate to a liquid comprising N-methyl-2-pyrrolidone as a principal component, and then conducting distillation (for example, Japanese Patent Application Laid-Open No. 11-349566).

As a process for recovering N-methyl-2-pyrrolidone from a slurry of a PAS obtained by reacting an alkali metal sulfide with a dihalo-aromatic compound in N-methyl-2-pyrrolidone to purify it, there has also been proposed a process comprising adding a small amount of ammonia or amine to a liquid comprising N-methyl-2-pyrrolidone as a principal component, and then conducting distillation (for example, Japanese Patent Application Laid-Open No. 2001-354769).

However, the processes for recovering and purifying the organic amide solvent by adding such alkaline compound(s) are not suitable for recovering and purifying the washing solvents such as acetone and methanol. In fact, even when any of the above-described processes is applied to a liquid comprising such a washing solvent as a principal component after the washing step, lowering of the crystallization temperature of a PAS formed or coloring thereof cannot be prevented when the washing solvent recovered is reused in the washing step.

DISCLOSURE OF THE INVENTION

It is an object of the present invention to provide a production process of a poly(arylene sulfide), comprising the steps of washing a poly(arylene sulfide) obtained by a polymerization step in an organic amide solvent with an organic solvent, recovering the organic solvent and then reducing the content of impurities, which are contained in the organic solvent recovered and adversely affect the quality of the PAS formed, to recycle the purified organic solvent through the washing step.

Another object of the present invention is to provide a novel washing method of a poly(arylene sulfide), in which an organic solvent used in washing is recycled through a washing step.

A further object of the present invention is to provide an effective purification process of an organic solvent used in washing.

The present inventors have carried out an extensive investigation with a view toward achieving the above objects. As a result, the inventors have paid attention to the fact that in a production process of a PAS by heating and polymerizing a dihalo-aromatic compound and a sulfur source such as an alkali metal sulfide in an organic amide solvent, an alkaline compound such as methylamine is secondarily produced, which is considered to be attributable to decomposition of the organic amide solvent. It has been found that when this alkaline compound is mixed in a washing solvent, the compound is difficult to be removed even by distillation and accumulates in the washing solvent during repeated use and recovery of the washing solvent.

Thus, the present inventors have carried out a further investigation. As a result, it has been found that when an inorganic solvent such as hydrochloric acid is added to the washing solvent recovered from the washing step to convert the alkaline compound such as methylamine to a salt with the inorganic acid, and distillation is then conducted, the content of the alkaline compound, which greatly adversely affects the physical properties of the PAS, can be effectively lowered.

It has also been found that the alkaline compound such as methylamine can be markedly lowered even by treating the washing solvent recovered from the washing step with activated carbon.

As a result, it has been proven that even when the washing solvent such as acetone is recycled repeatedly at least several tens times, the adverse influence on the physical properties of the PAS can be markedly relaxed. The present invention has been led to completion on the basis of these findings.

According to the present invention, there is provided a process for producing a poly(arylene sulfide), which comprises the respective steps of:
(1) a polymerization step of heating and polymerizing at least one sulfur source selected from the group consisting of alkali metal sulfides and alkali metal hydrosulfides and a dihalo-aromatic compound in an organic amide solvent (A) after an alkali metal hydroxide is added as needed,
(2) a separation step of separating a polymer formed from the reaction mixture containing the polymer after the polymerization step,
(3) a washing step of washing the polymer separated with an organic solvent (B),
(4) a purification step of purifying the organic solvent (B) recovered after the washing step to lower the content of an alkaline compound mixed therein, and
(5) a step of recycling the organic solvent (B) purified through the washing step of the poly(arylene sulfide).

According to the present invention, there is also provided a process for producing a poly(arylene sulfide), comprising the step of washing the poly(arylene sulfide) obtained by a polymerization step in an organic amide solvent (A) with an organic solvent (B), wherein the washing is conducted with an organic solvent (B), the content of an alkaline compound in which has been lowered to at most 3,000 ppm by weight, to provide a poly(arylene sulfide) having a yellow index (YI) of at most 15.0. In this production process, when a treatment for raising a crystallization temperature is conducted after the washing, a poly(arylene sulfide) having a crystallization temperature (Tmc) of at least 200° C. and a yellow index (YI) of at most 11.0 is provided.

According to the present invention, there is further provided a method for washing a poly(arylene sulfide) obtained by a polymerization step in an organic amide solvent (A) with an organic solvent (B), comprising recovering the organic solvent (B) used in a washing step to recycle it through the washing step, wherein the content of an alkaline compound in the organic solvent (B) recovered at that time is lowered to at most 3,000 ppm by weight to recycle the organic solvent (B) thus treated through the washing step.

According to the present invention, there is still further provided a process for purifying an organic solvent used in washing, which comprises washing a poly(arylene sulfide) obtained by a polymerization step in an organic amide solvent (A) with an organic solvent (B), recovering the organic solvent (B) and then adding an inorganic acid to the organic solvent (B) recovered to conduct distillation.

BEST MODE FOR CARRYING OUT THE INVENTION

1. Sulfur Source:

In the present invention, at least one sulfur source selected from the group consisting of alkali metal hydrosulfides and alkali metal sulfides is used as a sulfur source. As examples of the alkali metal sulfides, may be mentioned lithium sulfide, sodium sulfide, potassium sulfide, rubidium sulfide, cesium sulfide and mixtures of two or more compounds thereof. These alkali metal sulfides are generally commercially-available and used in the form of a hydrate. Examples of the hydrate include sodium sulfide nonahydrate ($Na_2S.9H_2O$) and sodium sulfide pentahydrate ($Na_2S.5H_2O$). The alkali metal sulfide may be used as an aqueous mixture.

As a sulfur source, an alkali metal hydrosulfide may be used in combination with an alkali metal hydroxide. As examples of the alkali metal hydrosulfide, may be mentioned lithium hydrosulfide, sodium hydrosulfide, potassium hydrosulfide, rubidium hydrosulfide, cesium hydrosulfide and mixtures of two or more compounds thereof. The alkali metal hydrosulfide may be used in any form of an anhydride, a hydrate and an aqueous solution. Among these, sodium hydrosulfide and lithium hydrosulfide are preferred in that they are industrially available on the cheap. The alkali metal hydrosulfide is preferably used as an aqueous mixture (i.e., a mixture with water having fluidity) such as an aqueous solution from the viewpoints of treatment operation, metering, etc.

In general, a small amount of an alkali metal sulfide is secondarily produced in a production process of the alkali metal hydrosulfide. A small amount of the alkali metal sulfide may be contained in the alkali metal hydrosulfide used in the present invention. In this case, the total molar quantity of the alkali metal hydrosulfide and alkali metal sulfide becomes a sulfur source charged after a dehydration step.

Examples of the alkali metal hydroxide include lithium hydroxide, sodium hydroxide, potassium hydroxide, rubidium hydroxide, cesium hydroxide and mixtures of two or more compounds thereof. Among these, sodium hydroxide and lithium hydroxide are preferred in that they are industrially available on the cheap. The alkali metal hydroxide is preferably used as an aqueous mixture such as an aqueous solution.

In the production process according to the present invention, examples of water to be dehydrated in a dehydration step includes water of hydration, a water medium of an aqueous solution and water secondarily produced by a reaction of the alkali metal hydrosulfide with the alkali metal hydroxide, or the like.

2. Dihalo-aromatic Compound:

The dihalo-aromatic compound used in the present invention is a dihalogenated aromatic compound having 2 halogen atoms directly bonded to the aromatic ring. Specific examples of the dihalo-aromatic compound include o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide and dihalodiphenyl ketone.

Here, the halogen atom means each atom of fluorine, chlorine, bromine and iodine atoms, and 2 halogen atoms in the dihalo-aromatic compound may be the same or different from each other. These dihalo-aromatic compounds may be used either singly or in any combination thereof.

The amount of the dihalo-aromatic compound charged is generally 0.90 to 1.50 mol, preferably 0.95 to 1.20 mol, more preferably 1.00 to 1.09 mol per mol of the sulfur source (alkali metal sulfide and/or alkali metal hydrosulfide) remaining in the system after the dehydration step.

3. Molecular Weight Modifier, Branching or Crosslinking Agent:

In order to, for example, form a terminal of a specific structure in a PAS formed or regulate a polymerization reaction or a molecular weight, a monohalo-compound (may not be always an aromatic compound) may be used in combination. In order to form a branched or crosslinked polymer, a polyhalo-compound (may not be always an aromatic compound), to which at least 3 halogen atoms are bonded, an active hydrogen-containing halogenated aromatic compound, a halogenated aromatic nitro compound or the like may also be used in combination. As the polyhalo-compound as a branching or crosslinking agent is preferred trihalobenzene.

4. Organic Amide Solvent:

In the present invention, an organic amide solvent that is an aprotic polar organic solvent is used as a solvent for a dehydration reaction and a polymerization reaction. The organic amide solvent is preferably stable to an alkali at a high temperature.

Specific examples of the organic amide solvent include amide compounds such as N,N-dimethylformamide and N,N-dimethylacetamide; N-alkylcaprolactam compounds such as N-methyl-ϵ-caprolactam; N-alkylpyrrolidone compounds or N-cycloalkylpyrrolidone compound such as N-methyl-2-pyrrolidone and N-cyclohexyl-2-pyrrolidone; N,N-dialkyl-imidazolidinone compounds such as 1,3-dialkyl-2-imidazolidinones; tetraalkylurea compounds such as tetramethylurea; and hexaalkylphosphoric triamide compounds such as hexamethylphosphoric triamide. These organic amide solvents may be used either singly or in any combination thereof.

Among these organic amide solvents, N-alkyl-pyrrolidone compounds, N-cycloalkylpyrrolidone compounds, N-alkyl-caprolactam compounds and N,N-dialkyl-imidazolidinone compounds are preferred, and N-methyl-2-pyrrolidone, N-methyl-ϵ-caprolactam and 1,3-dialkyl-2-imidazolidinones are particularly preferably used.

The amount of the organic amide solvent used in the polymerization reaction in the present invention is generally within a range of 0.1 to 10 kg per mol of the sulfur source.

5. Polymerization Aid:

In order to promote the polymerization reaction to obtain a PAS having a high polymerization degree in a short period of time, various kinds of polymerization aids may be used in the present invention as needed. Specific examples of the polymerization aids include metal salts of organic sulfonic acids, lithium halides, metal salts of organic carboxylic acids and alkali metal salts of phosphoric acid, which are generally publicly known as polymerization aids for PASs. Among these, metal salts of organic carboxylic acids are particularly preferred because they are cheap.

The amount of the polymerization aid used varies according to the kind of the compound used. However, it is generally within a range of 0.01 to 10 mol per mol of the sulfur source charged.

6. Dehydration Step:

A dehydration step is preferably arranged as a preliminary step for a polymerization step in order to control the amount of water in the reaction system. The dehydration step is performed by a process comprising heating and reacting an alkali metal sulfide and/or an alkali metal hydrosulfide in an organic amide solvent in the presence of an alkali metal hydroxide as needed, desirably, under an inert gas atmosphere and discharging water outside the system by distillation.

Since the alkali metal sulfide is generally used as a hydrate or aqueous mixture, it contains more water than the polymerization reaction needs. When the alkali metal hydrosulfide is used as a sulfur source, an alkali metal hydroxide of the order of an equimolar amount is added to allow the alkali metal hydrosulfide to react therewith in situ in an organic amide solvent.

In the dehydration step, the dehydration is conducted until the content of water comprising water of hydration (water of crystallization), a water medium, secondarily produced water, etc. is lowered within a range of necessary amounts. In the dehydration step, the dehydration is conducted until the water content in the polymerization reaction system is reduced to generally about 0.3 to 5 mol, preferably about 0.5 to 2 mol per mol of the sulfur source. When the water content has become too low in the dehydration step, water may be added prior to a polymerization step to adjust the water content to a desired value.

The charging of these raw materials into a reaction vessel is conducted within a temperature range of generally from ordinary temperature to 300° C., preferably from ordinary temperature to 200° C. The charging of the raw materials may not be in order, and the respective raw materials may be additionally charged in the course of the dehydration process. An organic amide solvent is used as a solvent used in the dehydration step. This solvent is preferably the same as the organic amide solvent used in the polymerization step, and N-methyl-2-pyrrolidone is particularly preferred. The amount of the organic amide solvent used is generally about 0.1 to 10 kg per mol of the sulfur source charged in the reaction vessel.

The dehydration process is conducted by heating the mixture after charging the raw materials into the reaction vessel in a temperature range of generally up to 300° C., preferably from 100 to 250° C. for generally 15 minutes to 24 hours, preferably 30 minutes to 10 hours. Heating methods include a method of retaining a fixed temperature, a method of raising the temperature either stepwise or continuously and a method of combining both methods. The dehydration step is conducted by, for example, a batch system, a continuous system or a combined system thereof.

An apparatus for conducting the dehydration step may be the same as a reaction vessel (reactor) used in the subsequent polymerization step or different from it. A material of the apparatus is preferably a corrosion resistant material such as titanium. In the dehydration step, a part of the organic amide solvent is generally discharged together with water outside the reaction vessel. At that time, hydrogen sulfide is discharged as a gas outside the system.

7. Polymerization Step:

The polymerization step is conducted by charging a dihaloaromatic compound into the mixture after completion of the dehydration step and heating the sulfur source and the dihaloaromatic compound in an organic amide solvent. When a polymerization vessel different from the reaction vessel used in the dehydration step is used, the mixture after the dehydration step and the dihalo-aromatic compound are charged into the polymerization vessel. After the dehydration step and before the polymerization step, the amounts of the organic amide solvent and coexisting water may be controlled as needed. Before the polymerization step or during the polymerization step, a polymerization aid and other additives may be mixed.

The mixing of the mixture obtained after completion of the dehydration step with the dihalo-aromatic compound is conducted within a temperature range of generally from 100 to 350° C., preferably from 120 to 330° C. When the respective components are charged into the polymerization vessel, no particular limitation is imposed on the order of charging, and both components are charged in small portions or at a time.

The polymerization reaction is conducted at generally 100 to 350° C., preferably 120 to 330° C., more preferably 170 to 290° C. As a heating method for this reaction, is used a method of retaining a fixed temperature, a method of raising the temperature either stepwise or continuously or a combination of both methods. The polymerization reaction time is within a range of generally from 10 minutes to 72 hours, desirably from 30 minutes to 48 hours. The amount of the organic amide solvent used in the polymerization step is within a range of generally 0.1 to 10 kg, preferably 0.15 to 1 kg per mol of the charged sulfur source existing in the polymerization step. The amount may be changed in the course of the polymerization reaction so far as it falls within this range.

The content of water upon the beginning of the polymerization reaction is preferably controlled within a range of generally 0.3 to 5 mol per mol of the sulfur source charged. When it is intended to obtain a low-molecular weight polymer or oligomer, or a special polymerization process is adopted, however, the water content may be changed outside this range. For example, the water content may be controlled within a range of 0.1 to 15 mol, preferably 0.5 to 10 mol per mol of the sulfur source such as an alkali metal sulfide. The water content may be increased in the course of the polymerization reaction or decreased by distillation to the contrary.

Examples of polymerization processes comprising increasing the water content in the course of the polymerization reaction include a process comprising conducting a reaction at a temperature of 170 to 270° C., preferably 180 to 235° C. in the presence of water in an amount of 0.5 to 2.4 mol, preferably 0.5 to 2.0 mol per mol of the sulfur source charged to control a conversion of the dihalo-aromatic compound to 50 to 98 mol %, adding water so as to bring about a state that water exists in a proportion of more than 2.0 mol, but up to 10 mol, preferably 2.5 to 7.0 mol per mol of the sulfur source charged, and then heating the reaction system to a temperature of 245 to 290° C., thereby continuing the reaction. When the dehydration step is arranged in this production process, the charged sulfur source means an amount of the sulfur source remaining in the reaction vessel after the dehydration step.

As a particularly preferable production process, may be mentioned a process comprising conducting a polymerization reaction in the polymerization step by an at least two-stage polymerization process comprising:

(1) Step 1 of heating a reaction mixture containing the organic amide solvent, the sulfur source (A) and the dihalo-aromatic compound (B) to 170 to 270° C. in the presence of water in an amount of 0.5 to 2.0 mol per mol of the sulfur source (A) charged to conduct a polymerization reaction, thereby forming a prepolymer that a conversion of the dihalo-aromatic compound is 50 to 98%, and (2) Step 2 of controlling the amount of water in the reaction system so as to bring about a state that water exists in a proportion of more than 2.0 mol, but up to 10 mol per mol of the sulfur source (A) charged, and heating the reaction system to 245 to 290° C., thereby continuing the polymerization reaction.

In Step 1, it is desirable to form a prepolymer having a melt viscosity of 0.5 to 30 Pa·s as measured at a temperature of 310° C. and a shear rate of 1,216 sec$^{-1}$. In Step 2, the polymerization reaction is continued until the melt viscosity of the prepolymer is increased.

Water may be added at a final stage of the polymerization reaction or upon completion thereof to increase the water content for the purpose of lowering the contents of common salt secondarily produced and impurities in the polymer formed or collecting the polymer in the form of particles. To the polymerization step according to the present invention, may be applied many of other publicly known polymerization processes or modified processes thereof, and the present invention is particularly not limited to a particular polymerization process.

The polymerization reaction system may be a batch system, a continuous system or a combination of both systems. In the batch-wise polymerization, 2 or more reaction vessels may be used for the purpose of shortening the polymerization cycle time.

8. Post Treatment Step:

In the production process according to the present invention, a post treatment after the polymerization reaction may be conducted in accordance with a method known per se in the art. For example, after completion of the polymerization reaction, a product slurry cooled is separated by filtration as it is or after diluted with water or the like, and the resulting filter cake is washed and filtered repeatedly, and then dried, whereby a PAS can be collected. The product slurry may be subjected to sieving as it is in a high-temperature state, thereby collecting the polymer.

After the separation (sieving) by filtration, the PAS is washed with the same organic amide solvent as the polymerization solvent, or an organic solvent such as a ketone (for example, acetone) or an alcohol (for example, methanol). The PAS may be washed with hot water or the like. The PAS formed may also be treated with an acid or a salt such as ammonium chloride.

9. Recovery and Purification of Washing Solvent:

In the present invention, after the separation step of separating the polymer from the reaction mixture containing the polymer formed after the polymerization step, a washing step of washing the polymer separated with an organic solvent (B) is arranged, and a purification step of purifying the organic solvent (B) recovered to lower the content of an alkaline compound mixed therein is further arranged after the washing step. The purified organic solvent (B) may be recycled through the washing step of the PAS. More specifically, the organic solvent (B) used in the washing step of the PAS may be purified to reuse it in a washing step of another PAS, and the number of times of reuse may also be increased.

In the washing step, the polymer is generally washed by bringing the polymer into contact with the organic solvent (B). More specifically, a wet cake of the polymer separated in the separation step and the organic solvent (B) are mixed and stirred. The amount of the organic solvent (B) used in the washing is of the order of generally 1 to 10 times, preferably 2 to 8 times as much as the weight of the polymer. After the washing step, the polymer is separated from a liquid component (C) containing the organic solvent (B) used in the washing. After the polymerization step, the PAS purified is generally collected as a granular polymer, and so the polymer can be sifted by means of a screen. Even in the separation step, thus, the reaction mixture containing the polymer formed can be subjected to sieving through a screen to separate the polymer.

In the separation step, it is preferred that a solid-liquid mixed component passed through a screen and containing the organic amide solvent (A) be separated into a solid component and a liquid component (D1), and an organic solvent (B) be added to the solid component separated to separate the mixture into a liquid component (D2) containing the organic amide solvent (A) and organic solvent (B) and a solid component in that the organic amide solvent (A) is efficiently recovered. Since the solid component is composed of fine particles of the by-product salt and/or the like, it is desirable to use a centrifugal separator or decanter in the separation between the liquid components (D1 and D2) and the solid components.

After the washing step, the organic solvent (B) is recovered from the liquid component (C) or a mixture of the liquid component (C) and the liquid component (D1 and/or D2) by distillation. The distillation may be generally simple distillation. However, the organic solvent (B) recovered by the mere simple distillation contains an alkaline compound such as methylamine, and the alkaline compound accumulates in the organic solvent (B) for washing when the washing and recovery are conducted repeatedly.

In the present invention, thus, an inorganic acid is added to the organic solvent (B) recovered by the distillation in the purification step to conduct distillation again, thereby lowering the content of the alkaline compound. Examples of the inorganic acid include hydrochloric acid, sulfuric acid and nitric acid. Among these, hydrochloric acid is preferred. When the inorganic acid is added to the organic solvent (B) recovered by the distillation, the inorganic acid reacts with the alkaline compound such as methylamine to form a salt (for example, hydrochloride), and the pH of the organic solvent is lowered. It is preferred that the inorganic acid be added to the organic solvent (B) recovered to adjust the pH thereof to lower than 10.0 in that the alkaline compound such as methylamine is efficiently removed.

In the purification step, the content of the alkaline compound can be lowered by bringing the organic solvent (B) recovered into contact with activated carbon. In the process according to the present invention, it is preferred to use the inorganic acid such as hydrochloric acid from the viewpoints of cost, pH control and the like.

The organic solvent (B) used in the washing step is preferably a ketone or alcohol. Acetone and methanol are more preferred, and acetone is particularly preferred. The alkaline compound is typically methylamine. According to the process of the present invention, the content of the alkaline compound (for example, methylamine) in the organic solvent (B) recovered by the distillation is lowered to at most 3,000 ppm, preferably at most 2,000 ppm, more preferably at most 1,000 ppm. Incidentally, ppm is based on the weight.

10. PAS:

According to the production process of the present invention, there can be provided a PAS having a crystallization temperature (Tmc) of at least 200° C., preferably at least 210° C., more preferably at least 220° C. a yellow index (YI) of at most 11.0, preferably at most 10.0, more preferably at most 7.0 when a treatment for raising a crystallization temperature. is conducted. Even when no treatment for raising a crystallization temperature is conducted, a PAS having a yellow index (YI) of at most 15.0, preferably at most 13.0, more preferably at most 11.0 can be provided.

No particular limitation is imposed on the melt viscosity (as measured at a temperature of 310° C. and a shear rate of 1,216 $\sec^{-1}$) of the PAS according to the present invention. However, it is preferably within a range of 30 to 800 Pa·s, more preferably 40 to 500 Pa·s. When the polymerization reaction is conducted by 2 stages, a PAS having a melt viscosity exceeding the melt viscosity of a prepolymer formed in the first-stage step (Step 1) is obtained in the second-stage step (Step 2).

The PASs obtained by the production process according to the present invention may be molded or formed into various injection-molded products or extruded products such as sheets, films, fibers and pipes either singly or by incorporating various kinds of inorganic fillers, fibrous fillers and/or various kinds of synthetic resins, if desired, as it is or after oxidized and crosslinked.

Since the PASs obtained by the process according to the present invention are little in lot-to-lot variation of melt viscosity, the processing thereof can be stably conducted, and the resulting formed or molded products are provided as high-quality products little in variations of various properties. The PAS is particularly preferably poly(phenylene sulfide) (PPS).

EXAMPLES

The present invention will hereinafter be described more specifically by the following Examples and Comparative Examples. Analyzing methods and measuring methods are as follows.

(1) Determination of Methylamine:

An 0.1 N aqueous solution of sodium hydroxide of the same weight as acetone was added to acetone [acetone/aqueous solution of sodium hydroxide=1/1 (weight ratio)] to analyze the content of methylamine contained in acetone by gas chromatography.

<Conditions of Gas Chromatographic Analysis>
  Apparatus: Hitachi G-3000,
  Temperature of vaporizing chamber: 180° C.,
  Column: packing material, PEG-20M+KOH (20%+5%), carrier, Uniport B60/80 mesh, 3 mm in diameter×3 m,
  Column temperature: 100° C.,
  Detector: FID (flame thermionic detector), 150° C.,
  Carrier gas: nitrogen, 30 ml/min, and
  Amount of sample: 2 µl.
  Incidentally, a value was found from a calibration curve using commercially available methylamine.

(2) Measurement of Crystallization Temperature (Tmc):

After a polymer was heated and melted by means of a hot press controlled to 320° C., the polymer was quenched to prepare an amorphous sheet. About 10 mg of an amorphous sheet portion was taken as a sample for measurement out of the amorphous sheet to measure its crystallization temperature (Tmc) under temperature-lowering conditions by means of a differential scanning calorimeter (DSC). Described specifically, the crystallization temperature was measured under conditions that the sample was heated up to 340° C. in a nitrogen gas atmosphere (20 ml/min) and held at that temperature for 10 minutes and then cooled at a rate of 10° C./min.

(3) Measurement of Color Tone:

A polymer was pressed under 15 MPa at room temperature for 1 minute by means of an electrical press machine to prepare tablets. The tablets were used as a sample for measurement to measure a color tone by means of TC-1800 (manufactured by Tokyo Denshoku Gijutsu Center) in accordance with a reflected light measuring method under conditions of standard light C, a visual field of 2° and a calorimetric system. Prior to the measurement, the apparatus was calibrated by a standard white plate. The measurement was conducted at 3 points as to each sample, and an average value thereof was calculated out. The color tone of the sample was indicated by a yellow index (YI).

(4) Melt Viscosity:

A melt viscosity was measured by means of Capirograph 1-C (manufactured by Toyo Seiki Seisakusho, Ltd.) using about 20 g of a dry polymer. At this time, a flat die of 1 mm in diameter×10 mm in length was used as a capillary, and the temperature was set to 310° C. After the polymer sample was placed in the apparatus and held for 5 minutes, the melt viscosity was measured at a shear rate of 1,216 sec$^{-1}$.

Referential Example 1

(1) Polymerization Step:

After 1,300 kg of N-methyl-2-pyrrolidone (hereinafter abbreviated as "NMP") was charged into a reaction vessel and heated to 150° C., 300 kg (3.42 kmol in terms of NaSH) of sodium hydrosulfide having a concentration of 64% by weight and 185 kg (3.47 kmol) of sodium hydroxide having a concentration of 75% by weight were charged, and heating was conducted until the temperature within the reaction vessel reached 200° C. to conduct a dehydration reaction. The amount of hydrogen sulfide volatilized out by this dehydration step was 2 kg (0.06 kmol). This value was used to calculate out an amount of the sulfur source within the reaction vessel, and it was found to be 3.36 kmol.

This reaction vessel was charged with 500 kg (3.40 kmol) of p-dichlorobenzene (hereinafter abbreviated as "pDCB") [pDCB/sulfur source (molar ratio)=1.012], and the contents were heated up to 220° C. to conduct a reaction for 5 hours. The reaction vessel was then charged with 100 kg of water, and the contents were heated up to 260° C. to conduct a reaction for 5 hours. After completion of the polymerization reaction, the reaction vessel was cooled near to room temperature to obtain a reaction mixture as a slurry.

(2) Separation Step of Polymer:

The reaction mixture was sifted through a screen having a sieve opening of 150 μm (100 mesh) to separate it into a wet cake containing a granular polymer on the screen and a component passed through the screen.

(3) Washing Step of Polymer:

After the wet cake was brought into contact with high-purity acetone (containing no methylamine; the same shall apply hereinafter) in an amount 5 times as much as the weight of the polymer while stirring at room temperature for 10 minutes, it was sifted through a screen having a sieve opening of 150 μm to separate it into a polymer component captured on the screen and a component passed through the screen. The above-described process was conducted as to the polymer component captured on the screen once again. The whole amount of a liquid component (C) passed through the screen was recovered.

The polymer component captured on the screen was brought into contact with ion-exchanged water in an amount 5 times as much as the weight of the polymer while stirring at room temperature for 10 minutes, and it was then sifted through a screen having a sieve opening of 150 μm to collect a polymer component captured on the screen again. This process was further repeated twice. Thereafter, the polymer component captured on the screen and collected was brought into contact with a 0.6% by weight aqueous solution of acetic acid in an amount 5 times as much as the weight of the polymer for 40 minutes and sifted through a screen having a sieve opening of 150 μm to collect a polymer component captured on the screen.

Thereafter, the polymer component captured on the screen was brought into contact with ion-exchanged water in an amount 5 times as much as the weight of the polymer while stirring at room temperature for 10 minutes, it was then sifted through a screen having a sieve opening of 150 μm, and a polymer component captured on the screen was collected and dried at 105° C.

The polymer collected by the above-described processes was granular and had a melt viscosity of 143 Pa·s, a Tmc of 235° C. and a YI of 5.6.

(4) Recovery Step of Polymerization Solvent:

The component passed through the screen by the first sieving of the reaction mixture containing the reaction product in the above-described separation step of polymer contains NMP that is a polymerization solvent, secondarily produced salts, a low-molecular weight PPS component, water and organic impurities such as methylamine.

In order to recover NMP from these components, the component passed through the screen was separated into a liquid component (D1) and a solid component by centrifugal separation or decantation (decanter), the solid component was brought into contact with high-purity acetone in an amount 5 times as much as the weight of the polymer, and the resultant mixture was separated into a liquid component and a solid component to recover the liquid component (D2).

(5) Recovery Step of Washing Solvent:

The liquid components (C), (D1) and (D2) recovered in the respective processes described above were mixed, and the resultant mixture was subjected to simple distillation to recover acetone. The recovered acetone contained methylamine at a concentration of 200 ppm. The pH of a mixture (acetone/water=1/1 weight ratio) obtained by taking out a part of the acetone and adding the same weight of water thereto was 11.8.

(6) Repetitive Experiments of Respective Steps:

The steps (1) to (5) were performed in the same manner as described above except that the acetone (methylamine content: 200 ppm) recovered in the recovery step (5) of washing solvent was used in the washing step of polymer and the recovery step of polymerization solvent. In the recovery step (5) of washing solvent, acetone was recovered by simple distillation. The content of methylamine in the acetone (acetone by the second recovery) recovered increased to 420 ppm.

The above-described process was conducted repeatedly to recover acetone by simple distillation in the recovery step (5) of washing solvent. The content of methylamine in the acetone recovered was 1,230 ppm in the fifth recovery, 2,380 ppm in the tenth recovery or 4,710 ppm in the twentieth recovery. The results are shown in Table 1.

TABLE 1

Purification of acetone by simple distillation (pH before distillation = 11.8)

| Ref. Ex. 1 | Ordinal No. of times of recovery of acetone | 1st | 2nd | 5th | 10th | 20th |
|---|---|---|---|---|---|---|
| | Content of methylamine (ppm) | 200 | 420 | 1230 | 2380 | 4710 |

As apparent from the results shown in Table 1, it is understood that the purification of acetone is insufficient according to the recovering method of acetone by the simple distillation, and the content of methylamine markedly increases when the same acetone is used repeatedly in the washing step.

Example 1

The steps (1) to (5) were performed in the same manner as in Referential Example 1. As a result, acetone containing 200 ppm of methylamine was recovered. After aqueous hydrochloric acid was added to the acetone recovered to adjust it so as to give a water content of about 30% by weight and a pH of 6.0, the acetone was purified by conducting simple distillation again.

The content of methylamine in the acetone (acetone by the first recovery by the simple redistillation) purified and recovered in such a manner lowered to 20 ppm. The above-described whole process was conducted repeatedly. As a result, the content of methylamine in the acetone recovered was 45 ppm in the fifth recovery or 80 ppm in the tenth recovery. The results are shown in Table 2.

Example 2

The steps (1) to (5) were performed in the same manner as in Referential Example 1. As a result, acetone containing 200 ppm of methylamine was recovered. After aqueous hydrochloric acid was added to the acetone recovered to adjust it so as to give a water content of about 30% by weight and a pH of 9.0, the acetone was purified by conducting simple distillation again.

The content of methylamine in the acetone purified and recovered in such a manner lowered to 35 ppm. The above-described whole process was conducted repeatedly. As a result, the content of methylamine in the acetone recovered was 80 ppm in the fifth recovery or 170 ppm in the tenth recovery.

Example 3

After aqueous hydrochloric acid was added to the acetone (methylamine content: 4,710 ppm) recovered in the twentieth recovery in Referential Example 1 to adjust it so as to give a water content of about 30% by weight and a pH of 5.0, an acetone component was recovered by simple distillation. As a result, the content of methylamine therein lowered to 190 ppm. The result is shown in Table 2.

Example 4

The steps (1) to (5) were performed in the same manner as in Referential Example 1. As a result, acetone containing 200 ppm of methylamine was recovered. After aqueous hydrochloric acid was added to the acetone recovered to adjust it so as to give a water content of about 30% by weight and a pH of 10.0, the acetone was purified by conducting simple distillation again.

The content of methylamine in the acetone purified and recovered in such a manner lowered to 140 ppm. The above-described whole process was conducted repeatedly. As a result, the content of methylamine in the acetone recovered was 520 ppm in the fifth recovery or 1,280 ppm in the tenth recovery. The results are shown in Table 2.

TABLE 2

| | Acetone before simple redistillation | | | Methylamine content in acetone purified by simple redistillation (ppm) (Ordinal No. of times of recovery by simple redistillation) | | |
|---|---|---|---|---|---|---|
| Ex. | Inorganic acid | pH | Methylamine content in acetone recovered by simple distillation (ppm) | First | Fifth | Tenth |
| 1 | Aqueous HCl | 6.0 | 200 (first recovery) | 20 | 45 | 80 |
| 2 | Aqueous HCl | 9.0 | 200 (first recovery) | 35 | 80 | 170 |
| 3 | Aqueous HCl | 5.0 | 4710 (20th recovery) | 190 | — | — |
| 4 | Aqueous HCl | 10.0 | 200 (first recovery) | 140 | 520 | 1280 |

As apparent from the results shown in Table 2, it is understood that when aqueous hydrochloric acid is added to acetone recovered by simple distillation, and simple redistillation is then conducted, the content of methylamine contained in acetone can be markedly lowered. Example 3 indicates that even in the acetone having a methylamine content of 4,710 ppm recovered in the twentieth recovery in Referential Example 1, the content of methylamine contained in the acetone can be markedly lowered when aqueous hydrochloric acid is added to the acetone, and simple redistillation is then conducted. When the relevance between pH and the effect of lowering the methylamine content is observed, it is understood that the methylamine content can be more effectively lowered by adjusting the pH of acetone to lower than 10.0.

Example 5

Activated carbon was brought into contact with the acetone (methylamine content: 4,710 ppm) recovered in the twentieth recovery in Referential Example 1. As a result, the methylamine content lowered to 50 ppm.

Example 6

The process was performed in the same manner as in Referential Example 1 except that the acetone having a methylamine content of 80 ppm recovered in the tenth recovery in Example 1 was used in place of the high-purity acetone in the washing step of polymer in Referential Example 1. As a result, the resultant polymer had a melt viscosity of 140 Pa·s, a Tmc of 232° C. and a YI of 5.2. The results are shown in Table 3.

Example 7

The process was performed in the same manner as in Referential Example 1 except that the acetone having a methylamine content of 190 ppm recovered in the first recovery in Example 3 was used in place of the high-purity acetone in the washing step of polymer in Referential Example 1. The results are shown in Table 3.

Example 8

The process was performed in the same manner as in Referential Example 1 except that the acetone having a methylamine content of 520 ppm recovered in the fifth recovery in Example 4 was used in place of the high-purity acetone in the washing step of polymer in Referential Example 1. The results are shown in Table 3.

Example 9

The process was performed in the same manner as in Referential Example 1 except that the acetone having a methylamine content of 1,280 ppm recovered in the tenth recovery in Example 4 was used in place of the high-purity acetone in the washing step of polymer in Referential Example 1. The results are shown in Table 3.

Example 10

The process was performed in the same manner as in Referential Example 1 except that the acetone having a methylamine content of 2,380 ppm recovered in the tenth recovery in Referential Example 1 was used in place of the high-purity acetone in the washing step of polymer in Referential Example 1. The results are shown in Table 3.

Comparative Example 1

The process was performed in the same manner as in Referential Example 1 except that the acetone having a methylamine content of 4,710 ppm recovered in the twentieth recovery in Referential Example 1 was used in place of the high-purity acetone in the washing step (first washing) of polymer in Referential Example 1. The results are shown in Table 3.

TABLE 3

|  | Ref. Ex. 1 | Ex. 6 | Ex. 7 | Ex. 8 | Ex. 9 | Ex. 10 | Comp. Ex. 1 |
|---|---|---|---|---|---|---|---|
| Methylamine content in acetone (ppm) | 0 | 80 | 190 | 520 | 1280 | 2380 | 4710 |
| Melt viscosity (Pa·s) | 143 | 140 | 140 | 140 | 139 | 138 | 137 |
| Tmc (° C.) | 235 | 232 | 230 | 228 | 211 | 202 | 190 |
| YI | 5.6 | 5.2 | 6.0 | 6.5 | 7.3 | 10.4 | 12.6 |

As apparent from the results shown in Table 3, a PPS having a crystallization temperature (Tmc) of at least 200° C. and a YI of at most 11.0 can be obtained by purifying acetone so as to give a methylamine content of at most 3,000 ppm when acetone used in washing is used in another washing step. From the viewpoints of Tmc and YI, the content of methylamine in acetone recycled is preferably at most 2,000 ppm, more preferably at most 1,000 ppm, particularly preferably at most 500 ppm.

Referential Example 2

The process was performed in the same manner as in Referential Example 1 except that the treatment with the aqueous solution of acetic acid was not conducted. The polymer collected by this process had a melt viscosity of 250 Pa·s, a Tmc of 185° C. and a YI of 8.5. The results are shown in Table 4.

Example 11

The process was performed in the same manner as in Referential Example 2 except that the acetone having a methylamine content of 1,280 ppm recovered in the tenth recovery in Example 4 was used in place of the high-purity acetone in the washing step of polymer in Referential Example 2. The results are shown in Table 4.

Comparative Example 2

The process was performed in the same manner as in Referential Example 2 except that the acetone having a methylamine content of 4,710 ppm recovered in the twentieth recovery in Referential Example 1 was used in place of the high-purity acetone in the washing step of polymer in Referential Example 2. The results are shown in Table 4.

TABLE 4

|  | Ref. Example 2 | Example 11 | Comp. Example 2 |
|---|---|---|---|
| Methylamine content in acetone (ppm) | 0 | 1280 | 4710 |
| Melt viscosity (Pa·s) | 250 | 250 | 252 |
| Tmc (° C.) | 185 | 182 | 180 |
| YI | 8.5 | 8.6 | 15.8 |

INDUSTRIAL APPLICABILITY

According to the present invention, there can be provided production processes of PASs, comprising the steps of washing a PAS obtained by a polymerization step in an organic amide solvent with an organic solvent, recovering the organic solvent and then reducing the content of impurities, which are contained in the organic solvent recovered and adversely affect the quality of the PAS formed, to recycle the purified organic solvent through the washing step.

According to the production processes of the present invention, the PAS obtained is prevented from greatly deteriorating its quality such as crystallization temperature (Tmc) and yellow index (YI) even when the organic solvent for washing is recovered and used repeatedly.

According to the present invention, there can also be provided a washing method of PASs, by which the quality of the PASs is not deteriorated. According to the present invention, there can further be provided a purification process of an organic solvent for washing. According to the present invention, the organic solvent for washing can be recovered, purified and used repeatedly, so that cost can be reduced without deteriorating the quality of the PASs. The processes according to the present invention are suitable for mass-producing poly(arylene sulfides) by a great number of batches on an industrial scale and washing them.

The invention claimed is:
1. A process for producing a poly(arylene sulfide), which comprises the respective steps of:
(1) a polymerization step of heating and polymerizing at least one sulfur source selected from the group consisting of alkali metal sulfides and alkali metal hydrosul- fides and a dihalo-aromatic compound in an organic amide solvent (A) after an alkali metal hydroxide is added as needed, (2) a separation step comprising sifting a reaction mixture containing formed polymer through a screen to separate the polymer from the reaction mixture after the polymerization step, (3) a washing step comprising bringing the separated polymer into contact with an organic solvent (B) comprising a ketone or alcohol to wash the polymer, (4) a purification step of separating the polymer from a liquid component (C) containing the organic solvent (B) used in the washing step by sifting the polymer and wash medium through a screen after the washing step, recovering the organic solvent (B) from the liquid component (C) by distillation, and thereafter purifying the recovered organic solvent (B) by i) adding an inorganic acid to the recovered organic solvent (B) and then conducting distillation again, or ii) bringing the recovered organic solvent (B) into contact with activated carbon and then conducting distillation again, to lower the content of methylamine mixed therein to be at most 3,000 ppm by weight, and (5) a step of recycling the purified organic solvent (B) to the washing step of the poly(arylene sulfide).

2. The production process according to claim 1, wherein in the separation step, after the reaction mixture containing the formed polymer is sifted through a screen to separate the polymer, a component passed through the screen and containing the organic amide solvent (A) is separated into a solid component and a liquid component (D1), and an organic solvent (B) is then added to the separated solid component to separate the mixture into a liquid component (D2) containing the organic amide solvent (A) and organic solvent (B) and a solid component.

3. The production process according to claim 2, wherein after the washing step, the organic solvent (B) is recovered from a mixture of the liquid component (C) and the liquid components (D1) and (D2) by distillation.

4. The production process according to claim 1, wherein the inorganic acid is hydrochloric acid.

5. The production process according to claim 1, wherein the inorganic acid is added to the recovered organic solvent (B) to adjust the pH of the organic solvent to lower than 10.0, and the organic solvent (B) thus adjusted is then distilled.

6. The production process according to claim 1, wherein the organic solvent (B) used in the washing step is acetone.

7. The production process according to claim 1, wherein a dehydration step of heating and dehydrating a mixture containing the organic amide solvent, at least one sulfur source selected from the group consisting of alkali metal sulfides and alkali metal hydrosulfides and the alkali metal hydroxide added as needed to control a water content in the mixture is arranged as a step prior to the polymerization step.

8. The production process according to claim 1, wherein in the polymerization step, the polymerization reaction is conducted by an at least two-stage polymerization process comprising:

(I) Step 1 of heating a reaction mixture containing the organic amide solvent, the sulfur source and the dihalo-aromatic compound to 170 to 270° C. in the presence of water in an amount of 0.5 to 2.0 mol per mol of the sulfur source charged to conduct a polymerization reaction, thereby forming a prepolymer that a conversion of the dihalo-aromatic compound is 50 to 98%, and (II) Step 2 of controlling the amount of water in the reaction system so as to bring about a state that water exists in a proportion of more than 2.0 mol, but up to 10 mol per mol of the sulfur source charged, and heating the reaction system to 245 to 290° C., thereby continuing the polymerization reaction.

9. A process for producing a poly(arylene sulfide), comprising the step of washing the poly(arylene sulfide) obtained by a polymerization step in an organic amide solvent (A), with an organic solvent (B) comprising a ketone or alcohol, wherein the organic solvent (B) used in the washing step is recovered and recycled to the washing step of the poly (arylene sulfide), and, upon recycle, the content of methylamine in the organic solvent (B) from the previous washing step has been lowered to be at most 3,000 ppm by weight, to provide a poly(arylene sulfide) having a yellow index (YI) of at most 15.0.

10. The production process according to claim 9, wherein a treatment for raising a crystallization temperature is conducted after the washing with the organic solvent (B) to provide a poly(arylene sulfide) having a crystallization temperature (Tmc) of at least 200° C. as measured under temperature-lowering conditions and a yellow index (YI) of at most 11.0.

11. A method for washing a poly(arylene sulfide) obtained by a polymerization step in an organic amide solvent (A) with an organic solvent (B) comprising a ketone or alcohol, comprising recovering the organic solvent (B) used in a washing step to recycle it through the washing step, wherein the content of methylamine in the recovered organic solvent (B) is lowered to be at most 3,000 ppm by weight.

12. A process for purifying an organic solvent used in washing, which comprises washing a poly(arylene sulfide) obtained by a polymerization step in an organic amide solvent (A) with an organic solvent (B) comprising of a ketone or alcohol, conducting sifting through a screen to separate the polymer from a liquid component (C) containing the organic solvent (B) used in the washing, recovering the organic solvent (B) from the liquid component (C) by distillation, adding an inorganic acid to the recovered organic solvent (B), and then conducting distillation again.

* * * * *